(12) United States Patent
Sugaya

(10) Patent No.: US 6,832,091 B1
(45) Date of Patent: Dec. 14, 2004

(54) RADIO TRANSMISSION METHOD AND RADIO TRANSMISSION

(75) Inventor: Shigeru Sugaya, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/532,828

(22) Filed: Mar. 21, 2000

(30) Foreign Application Priority Data

Mar. 24, 1999 (JP) .......................................... P11-080099

(51) Int. Cl.[7] .............................................. H04Q 7/20
(52) U.S. Cl. ...................... 455/450; 455/11.1; 455/420; 370/501; 370/908
(58) Field of Search ................................ 455/402, 420, 455/426, 450, 507, 151.2, 11.1, 15; 370/425, 449, 501, 908, FOR 133; 709/104, 239, 252, FOR 155

(56) References Cited

U.S. PATENT DOCUMENTS

| | | | | |
|---|---|---|---|---|
| 5,371,734 A | * | 12/1994 | Fischer | 370/311 |
| 5,390,365 A | * | 2/1995 | Enoki et al. | 455/553 |
| 5,465,081 A | * | 11/1995 | Todd | 340/10.2 |
| 5,497,507 A | * | 3/1996 | Komaki | 455/552.1 |
| 5,627,528 A | * | 5/1997 | Kuznicki | 340/7.22 |
| 5,805,807 A | * | 9/1998 | Hanson et al. | 370/340 |
| 5,812,531 A | * | 9/1998 | Cheung et al. | 370/255 |
| 5,940,756 A | * | 8/1999 | Sibecas et al. | 455/426.1 |
| 6,097,707 A | * | 8/2000 | Hodzic et al. | 370/321 |
| 6,233,467 B1 | * | 5/2001 | Rydbeck | 455/566 |
| 6,351,468 B1 | * | 2/2002 | LaRowe et al. | 370/449 |
| 6,430,158 B1 | * | 8/2002 | Sugita | 370/242 |

* cited by examiner

Primary Examiner—William Trost
Assistant Examiner—James D Ewart
(74) Attorney, Agent, or Firm—Jay H. Maioli

(57) ABSTRACT

A radio transmission method for carrying out radio transmission in a radio transmission network formed of plural communication stations by control of a communication station set up as a central control station, wherein one station of the plural communication stations determines whether it is capable of relaying a signal sent from another station according to a condition of a power supply or the presence/absence of portability and, if it is determined that the relay transmission is possible, the one station sets up itself in a condition capable of relay transmission.

11 Claims, 11 Drawing Sheets

RADIO TRANSMISSION METHOD AND RADIO TRANSMISSION

BACKGROUND OF THE INVENTION

1. Field of the Invention

The present invention relates to a radio transmission method to be preferably applied to building up a local area network (LAN) among multiple appliances by transmitting various information by means of radio signals and a radio transmission apparatus to which the same radio transmission method is applied.

2. Description of the Related Art

Conventionally, when a local area network is built up among plural appliances like various video appliances or personal computer and their peripherals in a relatively small area such as home and office so as to transmit data handled among them, radio transmission method has been sometimes used by attaching a radio signal transmitting/reception device to respective appliances instead of connecting a signal line directly among those appliances.

By building up a local area network by radio transmission, the necessity of connecting respective appliances directly with a signal line is eliminated, thereby simplifying a system configuration.

However, if signals are transmitted from plural transmitters when a local area network is built through the plural radio transmitters, there is a possibility that a transmission error may occur. Thus, it is necessary to access-control communication among the respective transmitters in the network according to some method.

As a conventionally well known access control method in a small size radio network, there is a method of controlling communications among respective transmitters (terminal stations: nodes) in the network in a unified way with a central transmitter (central control station: root node) in a star type connection. For example, communication in the network is controlled by polling control. According to this method, the central control station in the network transmits a control signal for polling to the other nodes in the network successively so that transmission from each node is carried out in order according to the polling. By transmission processing by the polling, transmission efficiency can be improved.

In the star connection type network configuration, all communication stations in the network need to be capable of communicating with the central control station directly by radio, and therefore, the network configuration is limited. Thus, it has been proposed to make a communication station incapable of communicating with the central control station directly by radio act as a terminal station (hidden terminal station) of this network by relaying a control signal or the like sent from the central control station through a particular terminal station.

The communication station set up as the central control station needs to always transmit a control signal for polling and synchronous signal and always be actuated. Then, if the above described hidden terminal station is set up, it is necessary to always transmit a control signal for polling and synchronous signal to a communication station for relaying the control signal sent from the central control station to the hidden terminal station.

Therefore, the communication station which relays the control signal or the like needs to be always actuated. Thus, there is a problem that power consumption of a radio transmission apparatus constituting that communication station is relatively large. If the radio transmission apparatus is always powered by commercial AC power supply, there is no problem. However, if an incorporated battery is used as power supply, if the relay transmission is always executed, the duration of the battery is limited to a very short time. If the capacity of the battery is exhausted, the relay transmission of this radio transmission apparatus is disabled. Thus, there is, another problem that the hidden terminal station cannot communicate with other stations.

Further, a communication station which relays the control signal or the like from the central control station needs to be disposed at a position in which it is capable of communicating with both the central control station and the hidden terminal station directly. However, some radio transmission apparatus may be so structured to be portable and that portable radio transmission apparatus may be carried away. That is, some communication station is structured as a radio transmission apparatus in a relatively small size and powered by an incorporated secondary battery. For example, such a radio transmission station may be connected to an portable electronic apparatus and always carried from one place to another place.

As the communication station for relaying to the hidden terminal station, a particular station located at a position in which it is capable of communicating with both the central control station and the hidden terminal station directly is specified according to a topology map or the like determined by the central control station, for example. If such a portable radio transmission apparatus is specified as a relay station, there is a possibility that the relay transmission may be disabled when the portable radio transmission apparatus is carried to other place, so that communication with the hidden terminal station is also disabled.

Although a case in which the control signal from the central control station is relayed to the hidden terminal station has been stated here, the same problem occurs if a signal is relayed from the hidden terminal station to other terminal station.

SUMMARY OF THE INVENTION

Accordingly, an object of the present invention is to provide a radio transmission method which enables to choose a relay station favorably when a signal from a central control station is relayed in a radio network.

To achieve the above object, according to an aspect of the present invention, there is provided a radio transmission method for carrying out radio transmission in radio transmission network comprised of plural communication stations by control of a communication station set up as a central control station, wherein at least one of the plural communication stations determines a predetermined condition of itself, determines whether or not it is capable of relaying a signal sent from other station according to the determined condition and if it is determined that the relay transmission is possible, sets up itself in a condition capable of relay transmission.

According to this radio transmission method, only if each communication station is in a condition suitable for relay transmission, the relay transmission through that station is enabled. Therefore, if each communication station is not in the condition suitable for the relay transmission, no relay transmission is carried out in this network.

According to another aspect of the present invention, there is provided a radio transmission apparatus for carrying out radio communication with other communication station in a network, comprising: a communication processing means for transmitting or receiving a radio signal; a condition determining means for determining a predetermined condition of the apparatus; and a control means for determining whether or not relay transmission is possible according to determination of the condition determining means and carrying out the relay transmission with the communication processing means according to the determination.

According to this radio transmission apparatus, only when this radio transmission apparatus is in a condition suitable for the relay transmission, the relay transmission through this transmission apparatus is enabled. Therefore, if the transmission apparatus is not in the condition suitable for the relay transmission, this transmission apparatus is set to a condition not allowing the relay transmission.

DETAILED DESCRIPTION OF THE PREFERRED EMBODIMENTS

Hereinafter, the preferred embodiments of the present invention will be described with reference to the accompanying drawings.

Figure 1:
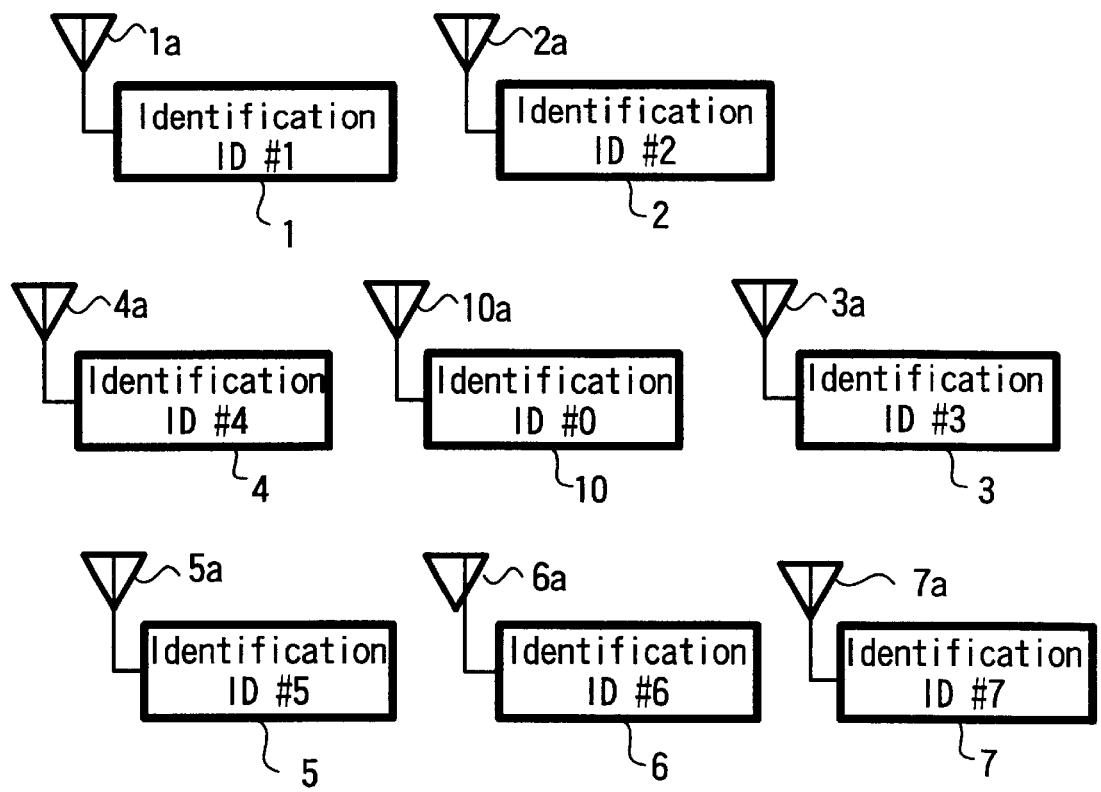
FIG. 1 is an explanatory diagram showing an example of network setting according to an embodiment of the present invention.

This example is a network system constructed as a system for transmitting and receiving video data, audio data and computer data in a relatively small office and home. A structure of this system will be described with reference to FIG. 1. In the network system of this example, a maximum number of radio transmission apparatus is determined preliminarily, and for example, the network is constructed with 16 units of the radio transmission apparatuses max. FIG. 1 shows a state in which eight radio transmission apparatuses 1–7, 10 are located. Antennas 1a–7a, 10a for carrying out transmission and reception are connected to each of the radio transmission apparatuses 1–7, 10. Video signal reproduction unit, monitor unit, computer unit, printer unit and other processing units (not shown) are connected to the respective radio transmission apparatuses 1–7, 10. Data transmission is carried out via a connected radio transmission apparatus if the data transmission is required between these processing units.

Eight radio transmission apparatuses 1–7, 10 function as a node which is a communication station and identification ID which is an identification number of each apparatus is given to each apparatus. That is, the transmission apparatus 10 is provided with #0 as identification ID and the transmission apparatuses 1–7 are provided with identification ID from #1 to #7 in order.

In this case, a radio transmission apparatus in the network system is set as a route node which functions as a central control station and radio communication between respective nodes is carried out by polling control from this control station. Basically, this control station is preferred to use a radio transmission apparatus disposed at a position enabling radio communication directly to all other stations in the system. In this case, the radio transmission apparatus 10 having the identification ID#0 disposed substantially in the center of the network system is used as the central control station so that peripheral stations are controlled by this central route node according to so-called star type connecting structure. Meanwhile, when in the following description, just a communication station is mentioned, it includes the central control station.

In this example, the radio transmission apparatus 7 having the identification ID#7 is disposed at a position where it cannot communicate directly with the radio transmission apparatus 10 which is the control station. However, the radio transmission apparatus 7 is disposed at a position where it is capable of communicating directly with the radio transmission apparatus 3 having the identification ID#3 and the radio transmission apparatus 6 having the identification ID#6.

Figure 2:
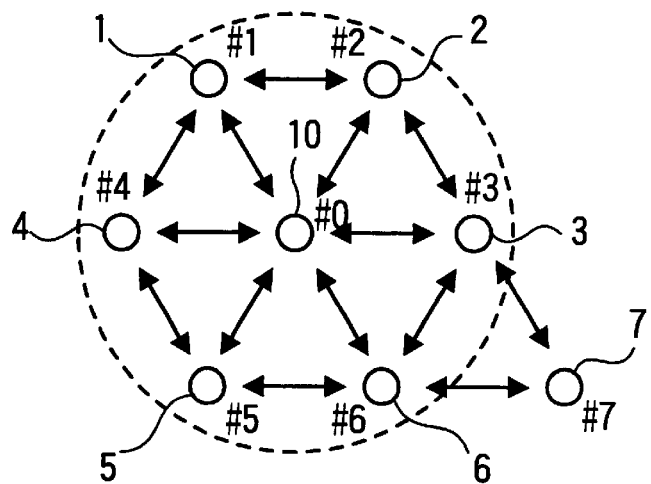
FIG. 2 is an explanatory diagram showing an example of topology map according to an embodiment of the present invention.

FIG. 2 is a diagram showing a physical topology map showing communication between respective stations in the disposition of the respective stations and control station of this example. An arrow indicates that direct communication is enabled between stations indicated by that arrow. Area a indicated by dashed line of FIG. 2 is an area in which direct communication with communication station 10 which is a root node is enabled. In this example, basically, the respective communication stations 1–7, 10 can communicate with only stations in the neighborhood. For example, the communication stations 1 having the identification ID#1 can communicate with the communication stations 2, 4, 10 having the identification ID# 2, #4, #10 disposed around the communication stations 1. This is the same for the other communication stations and the communication station (control station) 10 disposed substantially in the center can communicate with all other communication stations 1–6 except the communication station 7 having the identification ID#7 directly. To communicate between communication stations which cannot communicate with each other directly, other communication station carries out processing for relaying transmission data. To communicate with the communication station (hidden terminal station) 7 which the central control station cannot communicate directly, specified relay stations (terminal station 3 or 6) for the terminal station 7 relays control information from the central control station to the communication station 7. A processing for selecting this relay station will be described later.

Figure 3:
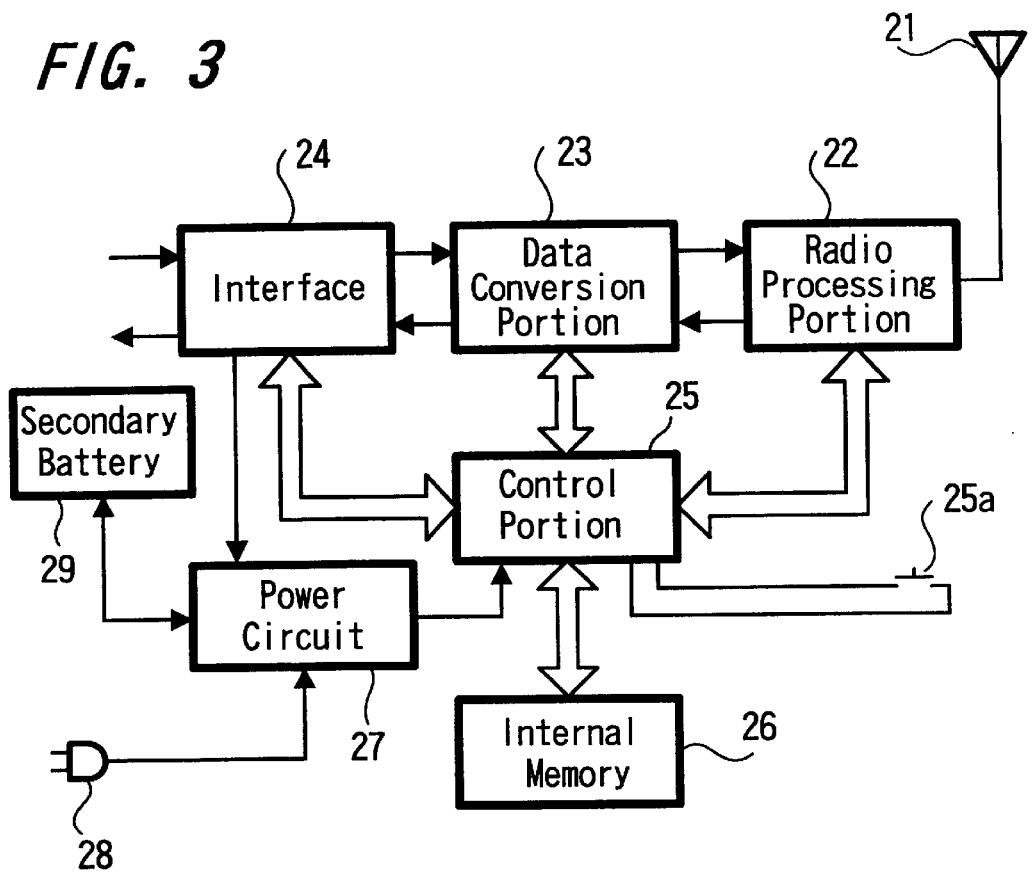
FIG. 3 is a block diagram showing a structure of radio transmission apparatus according to an embodiment of the present invention.

FIG. 3 shows an example of structure of the radio transmission apparatuses 1–7, 10 constituting each communication station. The respective radio transmission apparatuses 1–7, 10 have basically the same configuration (only control system for making function as a central control station is different from other communication stations). Each of the radio transmission apparatus includes an antenna 21 for carrying out transmission and reception and a radio processing portion 22 which is connected to the antenna 21 for carrying out transmission processing and reception processing for radio signal. In this case, as transmission system for carrying out transmission and reception in the radio processing portion 22, for example, transmission system with multi-carrier signal called OFDM (orthogonal frequency division multiplex) is employed and as a frequency for use in transmission and reception, for example, a very high frequency band (for example, 5 Ghz band) is used. In this example, a relatively low output is set up as a transmission output so that when used indoor, this output enables radio transmission over a relatively short distance of several meter to several ten meter.

Then, a data conversion portion 23 for converting data received by the radio processing portion 22 or to be transmitted by the radio processing portion 22 is provided. Data converted by this data conversion portion 23 is supplied to a processing unit through an interface portion 24 and data supplied from the connected processing unit is supplied to the data conversion portion 23 through the interface portion 24 so that the data is converted. When the interface portion 24 is connected to an external unit, for example, bus line specified as IEEE1394 standard is used. If this bus line is provided, a power supply line as well as a signal line for transmitting data and clock is provided depending on the cases.

Respective components in the radio transmission apparatus are so constructed that processing is carried out by a control of the control portion 25 constituted of microcomputer and the like. In this case, if a signal received by the radio processing portion 22 is a control signal, that received control signal is supplied to the control portion 25 through the data conversion portion 23. Then, the control portion 25 sets up respective components in a state indicated by that received control signal. As for a control signal to be transmitted from the control portion 25 to other transmission apparatus, the control signal is supplied from the control portion 25 to the radio processing portion 22 through the data conversion portion 23, so that the data is transmitted. If a received signal is synchronous signal, the control portion 25 determines a reception timing of the synchronous signal and sets up a frame frequency based on the synchronous signal and carries out transmission control processing with that frame frequency. Further, an internal memory 26 is connected to the control portion 25 and the internal memory 26 memorizes data necessary for transmission control temporarily.

The radio transmission apparatuses of this example contains a power supply circuit 27 and this power supply circuit 27 supplies a power for operating circuits in the apparatus. The power supply circuit 28 has a plug 28 which is to be connected to an external receptacle of commercial AC power or the like. The power supply circuit 28 rectifies and transforms an external power (commercial AC power) obtained through this plug 28 and supplies a DC low voltage power for actuating circuits in the radio transmission apparatus to the respective circuits. A bus line connected to the interface portion 24 has a power supply line. If power is supplied from a machine connected through the bus line to the radio transmission apparatus, it is permissible to supply power to be supplied to the interface portion 24 to the power supply circuit 27 and use it as a power for actuating circuits in the radio transmission apparatus. Further, if a secondary battery 29 is connected as the power supply circuit 27, it is permissible to recharge the secondary battery 29 when an external power is supplied, and if no external power from the plug 28 or no power from the interface portion 24 is supplied, use a charging current from the secondary battery 29 as a power.

Here, the power supply circuit 27 of this example determines which power is being used (external power supply, power supplied through the bus line, or power supplied from the battery) and data of its determination is supplied to the control portion 25. The control portion 25 determines a function which can be realized in this radio transmission apparatus based on data on application of the power supply and sets up correspondingly. Detail of a processing based on power supply condition will be described later.

Figure 4:
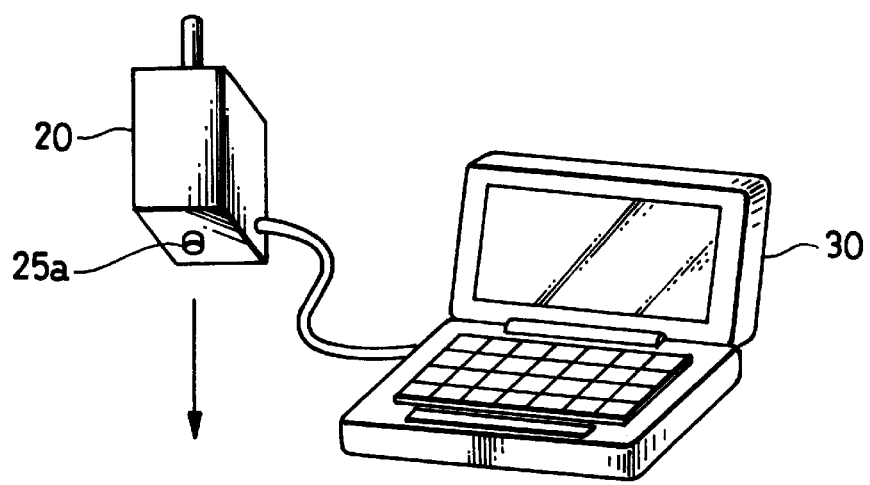
FIG. 4 is an explanatory diagram showing an example of connection of a transmission apparatus according to an embodiment of the present invention.

The radio transmission apparatus of this example has a switch 25a on a bottom surface or the like thereof. According to a state of the switch 25a, the control portion 25 determines an installation condition of the apparatus. FIG. 4 shows an example of the switch 25a. For example, the switch 25a is disposed on the bottom surface of the radio transmission apparatus and when this radio transmission apparatus 20 is placed on some base, the switch 25a is turned ON. FIG. 4 shows a case in which the radio transmission apparatus 20 is connected to a portable computer unit 30. The control portion 25 determines a function which can be realized with this radio transmission apparatus according to a state of the switch 25a. Detail of a processing based on determination of the installation condition will be described later.

Further, the radio transmission apparatus of this example has a display portion (not shown) so that an operating condition can be displayed by control of the control portion 25. This display portion may be comprised of a liquid crystal display panel for displaying the operating condition with characters, symbols and the like or plural pilot lamps constituted of light emission diodes or the like for indicating the operating condition with lighting condition of the pilot lamp.

Figure 5:
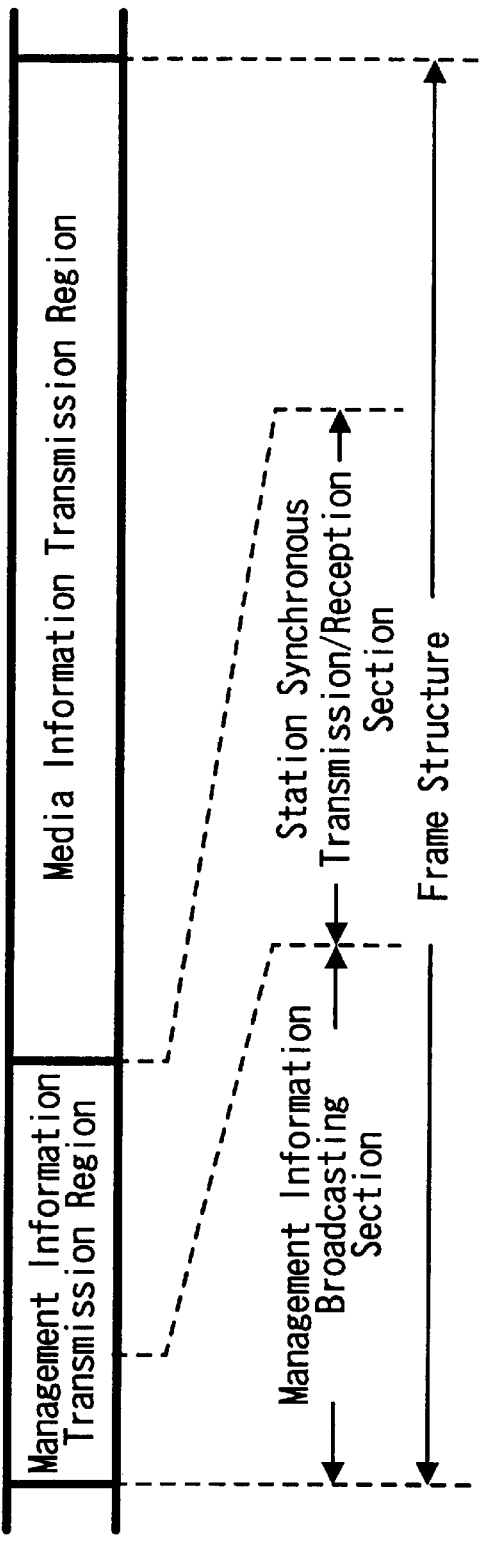
FIG. 5 is an explanatory diagram showing an example of a frame structure according to an embodiment of the present invention.

FIG. 5 shows a structure of signals transmitted between communication stations (radio transmission apparatuses 1–7, 10) in a network system of this example. In this example, the frame cycle is fixed to transmit data. That is, as shown in FIG. 5, a frame interval is specified by a predetermined interval. Then, a predetermined section at a head portion of the frame interval is specified as management information transmission region. In the management information transmission region, management information broadcasting section and station synchronous transmission/reception section are set up. A section other than the management information transmission region of each frame is specified as media information transmission region. Then, various data are transmitted through this media information transmission region by polling control or the like.

The management information broadcasting section transmits management information common to system from the central control station 10. This management information includes for example, synchronous data necessary for attaining frame synchronism in the network system, identification number data inherent of the network system, topology map in the network and the like.

In the existing station synchronous section of the station synchronous transmission/reception section of a frame, a predetermined number of slots (16 in this case) are set up with an equal interval and 16 slots in this frame are allocated to each of 16 communication stations in this network system. As for allocation of the slot, from a head slot successively, identification ID #0 communication station slot, identification ID#1 communicates slot, . . . identification ID#15 communication station slot are specified. In a slot allocated for each communication station, a communication station corresponding to that slot transmits a station synchronous signal. Because the network system is comprised of eight communication stations in this example, eight slots are used (eight slots from the head) and the remaining slots are not used (that is, no data is transmitted thereto). The station synchronous signal includes for example, identification ID data to be attached to each communication station and data about communication stations which that station can receive (data generated based on a reception state of station synchronous signal before a frame).

Figure 6:
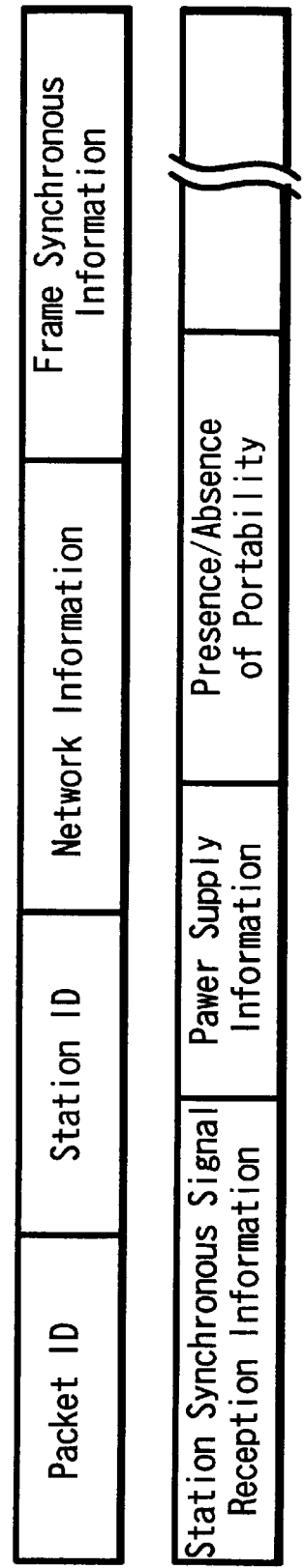
FIG. 6 is an explanatory diagram showing an example of transmission data structure according to an embodiment of the present invention.

FIG. 6 shows an example of a structure of station synchronous signal. Packet ID, station ID, network information, frame synchronous information, station synchronous signal reception information, power supply information, move possibility information and the like are disposed in order from the beginning. The power supply information is information about a condition of power supply to the radio transmission apparatus which constitutes each communication station. For example, this information indicates that commercial AC power or power supplied from other electronic appliance is used as a power source used by this communication station as an operating power or the secondary battery incorporated is used as power source. This information is generated by the control portion 25 in each communication station. The move possibility information is information about whether or not the radio transmission apparatus constituting this communication station can be carried. This information is generated by the control portion 25.

The station synchronous signal to be sent by each slot in the station synchronous transmission/reception section is received and processed by each communication station in the network. Transmission processing and reception processing of the station synchronous signal will be described later.

In the media information transmission region, data transmission processing between respective communication stations is carried out based on access control of the central control station. The access control by the central control station is executed by polling control from the central control station. In this polling control processing, the central control station calls each communication station successively with polling response request signal and the respective communication stations carry out transmission one by one.

If the communication station having an identification ID specified by the polling response request signal has data which should be sent, just after it receives the polling response request signal, it carries out transmission processing of that data immediately.

As data transmission in the media information transmission region, instead of this polling transmission, it is permissible to divide media information transmission region of a frame into plural slots preliminarily and then allocate the divided slots to communication stations sending transmission request by control of the central control station.

As for transmission processing at this time, it can be considered that either data transmission by asynchronous transmission mode or data transmission by isochronous transmission mode will be used depending on type of data to be transmitted. The asynchronous transmission mode is used for transmission of a relatively short data such as control data and isochronous transmission mode is used for transmission of data requiring real-time transmission such as video data and audio data. As such a transmission control system in which a transmission mode is prepared, for example, system specified as IEEE1394 can be applied.

When the asynchronous transmission mode is selected, it is preferable to transmit by polling control. When the isochronous transmission mode is selected, it is preferable to transmit by allocation according to the slot allocation.

Next, transmission processing and reception processing of the station synchronous signal will be described with reference to FIG. 7. Although as described above, 16 slots are prepared in the station synchronous transmission/reception section, it is assumed that eight slots from 0 slot to 7 slot are prepared to simplify the description and that respective slots are allocated to communication station 10, 1–7.

Figure 7:
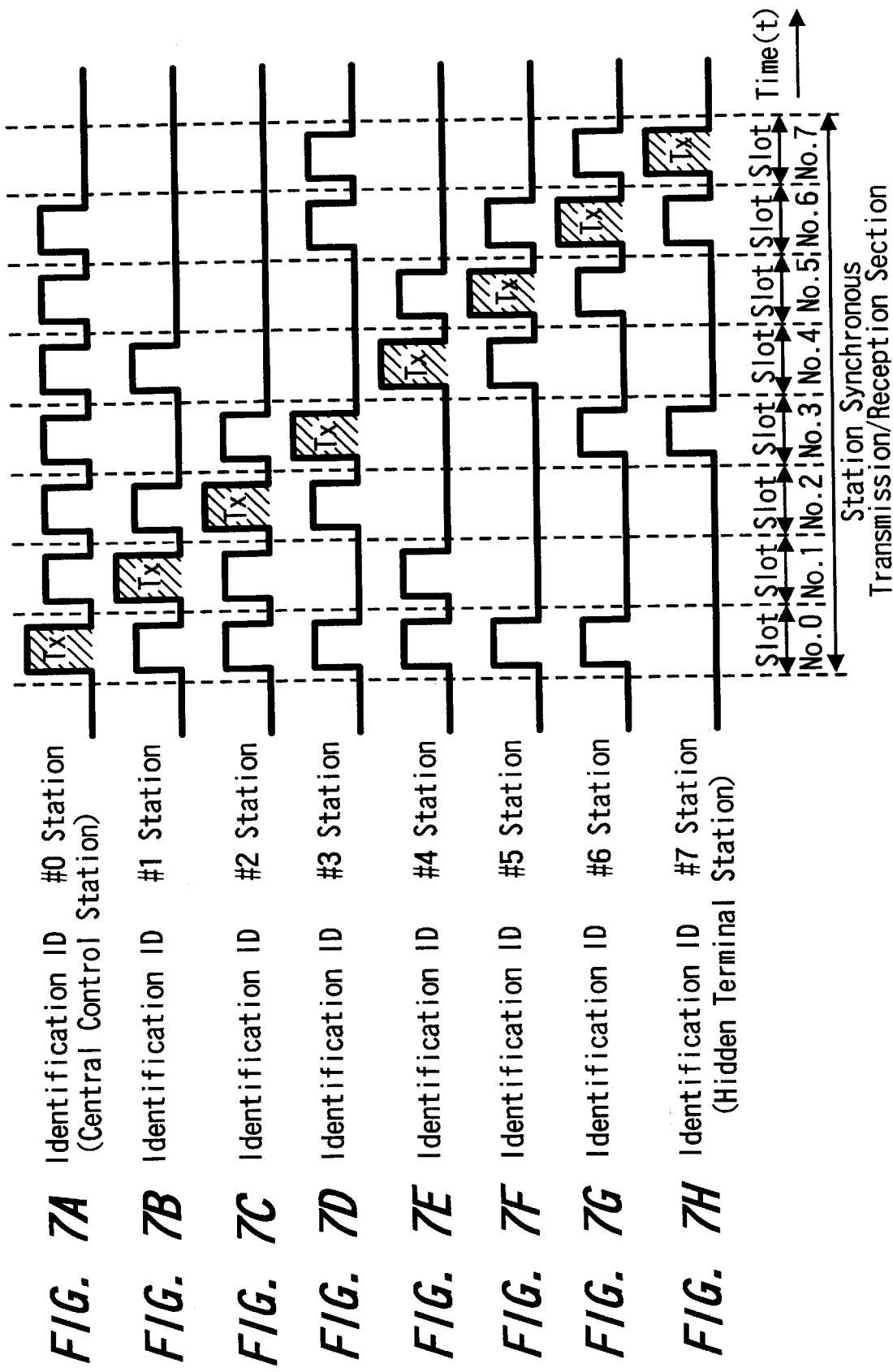
FIG. 7 is an explanatory diagram showing transmission condition in management area of each node according to an embodiment of the present invention.

A–H of FIG. 7 indicates communication in the station synchronous transmission/reception section of the eight communication stations. A of FIG. 7 indicates a state of communication station 10 which is the central control station. B–H of FIG. 7 indicates a state of communication stations 1–7 in order. In FIG. 7, a shaded portion indicates a state in which transmission processing Tx is carried out in the radio processing portion 22 which is a transmitting means of that communication station and radio transmission is carried out through the antenna 21. Other rising section like a pulse indicates a state in which a signal sent from other communication station is received appropriately by the radio processing portion 22 of other communication station. A section not rising like a pulse indicates a state in which such a signal cannot be received properly (although reception is tried, data cannot be decoded properly).

As shown by A of FIG. 5, transmission processing Tx of the station synchronous signal is carried out in 0 slot section by the communication station 10 of the identification ID#0 which is the central control station. In the other slots (sections after the first slot), reception processing is carried out. In reception up to the sixth slot, communication stations 1–6 allocated to those slots are at a position which they are capable of communicating by radio with the communication station 10. Therefore, data contained in each reception signal can be decoded properly. Conversely, in the seventh slot section, the communication station 7 is not at a position which it is capable of communicating directly with the communication station 10. Thus, at this slot position, data cannot be received. A of FIG. 7 shows transmission state of the station synchronous signal transmitted from the communication station 10 to the 0 slot. The communication stations 1–6 of identification ID#1–#6 are located within a range which a signal sent from the communication station 10 can reach. Although the station synchronous signal from the communication station 10 is received by the communication stations 1–6 properly, the communication station 7 of the identification ID#7 located far away cannot receive the station synchronous signal from the communication station 10.

In the communication stations 1–7 of the identification ID#1–#7, as shown by B–H of FIG. 7, a station synchronous signal is transmitted at a slot position allocated for each communication station and reception processing is carried out at the other slot positions. That is, the communication station 1 of the identification ID#1 carries out transmission processing Tx of station synchronous signal in the first slot as shown by B of FIG. 7 and reception processing in the other slots. At this time, communication stations 10, 2, 4 having the identification ID#0, #2, #4 are located adjacent the communication station 1 of the identification ID#1 and the communication station 1 can receive only node synchronous signal sent to the 0 slot, second slot and fourth slot properly as shown by B of FIG. 7.

As shown by C of FIG. 7, the communication station 2 of the identification ID#2 carries out transmission processing Tx of the station synchronous signal at the second slot and reception processing at the other slots. At this time, the communication stations 10, 1, 3 of the identification ID#0, #1, #3 are located adjacent the communication station 2. As shown by C of FIG. 7, the communication station 2 can receive only the station synchronous signal sent from these communication stations to the 0 slot, first slot and third slot properly.

As shown by D of FIG. 7, the communication station 3 of the identification ID#3 carries out transmission processing Tx of the station synchronous signal at the third slot and reception processing at the other slots. At this time, the communication stations 10, 2, 6, 7 of the identification ID#0, #2, #6, #7 are located adjacent the communication station 3. As shown by D of FIG. 7, the communication station 3 can receive only the station synchronous signal from these communication stations to the 0 slot, second slot, sixth slot and seventh slot properly.

As shown by E of FIG. 7, the communication station 4 of the identification ID#4 carries out transmission processing Tx of the station synchronous signal at the fourth slot and reception processing at the other slots. At this time, the communication stations 10, 1, 5 of the identification ID#0, #1, #5 are located adjacent the communication station 4. As shown by E of FIG. 7, the communication station 4 can receive only the station synchronous signal sent from these communication stations to the 0 slot, first slot and fifth slot properly.

As shown by F of FIG. 7, the communication station 5 of the identification ID#5 carries out transmission processing Tx of the station synchronous signal at the fifth slot and reception processing at the other slots. At this time, the communication stations 10, 4, 6 of the identification ID#0, #4 #6 are located adjacent the communication station 5. As shown by F of FIG. 7, the communication station 5 can receive only the station synchronous signal sent from these communication stations to the 0 slot, fourth slot, and sixth slot properly.

As shown by G of FIG. 7, the communication station 6 of the identification ID#6 carries out transmission processing Tx of the station synchronous signal at the sixth slot and reception processing at the other slots. At this time, the communication stations 10, 3, 5, 7 of the identification ID#0, #3, #5, #7 are located adjacent the communication station 6. As shown by G of FIG.7, the communication station 6 can receive only the station synchronous signal sent from these communication stations to the 0 slot, third slot, fifth slot and seventh slot properly.

As shown by H of FIG. 7, the communication station 7 of the identification ID#7 carries out transmission processing Tx of the station synchronous signal at the sixth slot and reception processing at the other slots. At this time, the communication stations 3, 6 of the identification ID#3, #6 are located adjacent the communication station 7. As shown by H of FIG. 7, the communication station 7 can receive only the station synchronous signal sent from these communication stations to the third slot and sixth slot properly.

Therefore, the communication station 10 which is the central control station cannot receive the station synchronous signal from the communication station 7, so that it cannot recognize an existence of the communication station 7 directly. However, the communication station 10 which is the central control station recognizes the existence of the communication station 7 through information contained in station synchronous signal from the communication station 3 of the identification ID#3 and communication station 6 of the identification ID#6.

The communication station 1–6 capable of receiving a signal from the communication station 10 which is the central control station directly recognize positions of the transmission slots allocated to itself with reference to a reception timing of the station synchronous signal from the communication station 10. Then, the communication station 7 not capable of receiving a signal from the communication station 10 directly recognizes a position of the transmission slot allocated to itself with reference to the reception timing of the station synchronous signal which the communication station 7 can receive. That is, a processing for recognizing the position of the seventh slot allocated to itself is carried out according to positions of the third slot and sixth slot.

Next, a processing for recognizing a power source connected to the apparatus by the control portion 25 of the radio transmission apparatus constituting each communication station will be described with reference to a flow chart of FIG. 8. First, the control portion 25 determines whether or not commercial AC power is supplied directly to this apparatus (step S11). If it is determined that commercial AC power is supplied, "Always Can be Powered" is displayed on a display portion of the radio transmission apparatus (step S12). Further, if no commercial AC power is supplied but the secondary battery is used as the power, "Not Always Can be Powered" is displayed on the display portion of the radio transmission apparatus (step S13). If the station is actuated with power supplied from an electronic appliance (for example, computer unit 30 shown in FIG. 4) connected to this radio transmission apparatus through the bus line, which the power actuating that appliance is commercial AC power or power from a battery incorporated in the apparatus is determined and then, processings of steps S12, S13 are carried out.

Then, if the control portion 25 makes this determination, a power supply condition determined at that time is memorized in the internal memory (step S14). The information of this power supply condition memorized in the memory 26 is attached to the power supply information section (see FIG. 6) of the station synchronous signal transmitted from this communication station and then, transmitted by radio in the network.

Figure 8:
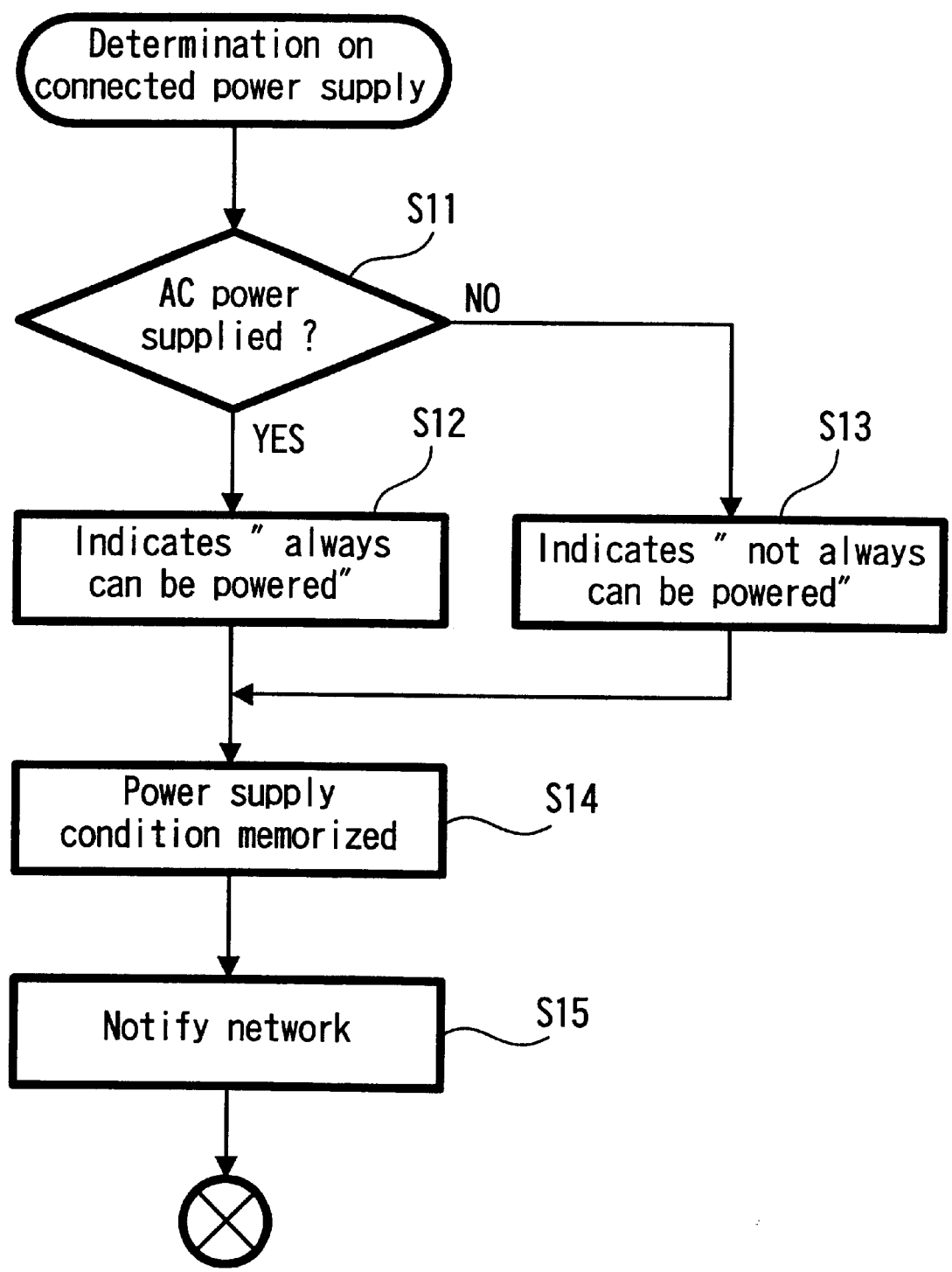
FIG. 8 is a flow chart showing an example of discrimination processing of a connected power supply according to an embodiment of the present invention.
Figure 9:
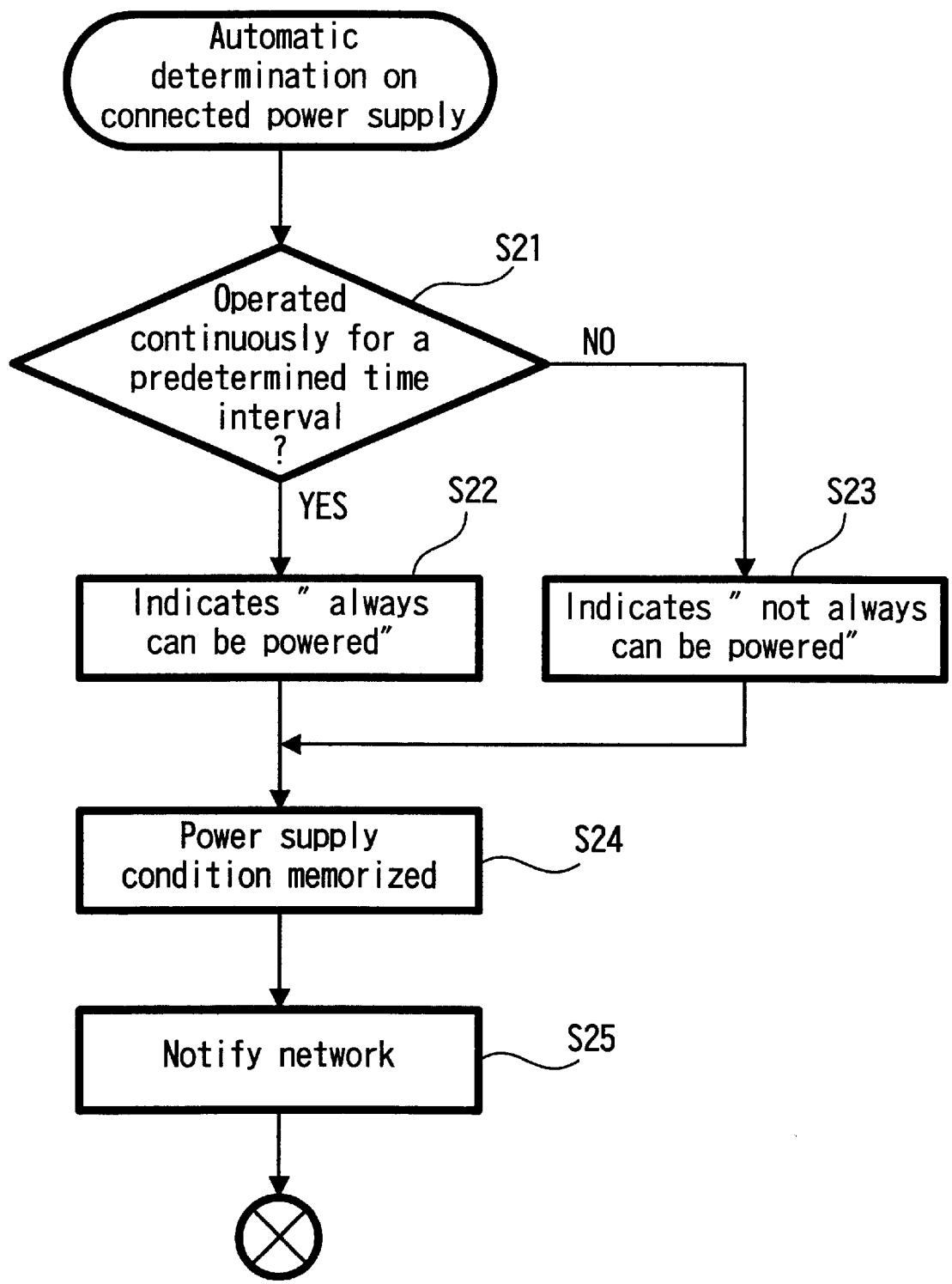
FIG. 9 is a flow chart showing an example of discrimination processing of a connected power supply according to another embodiment of the present invention.

Although according to a flow chart shown in FIG. 8, the power supply condition is recognized directly by the control portion 25, if the power type cannot be determined, it is permissible to determine a type of power supplied automatically into the control portion 25. That is, as shown by a flow chart of FIG.9, the control portion 25 determines whether or not the radio transmission apparatus constituting this communication station was operated continuously for a predetermined time interval (step S21). The predetermined time interval mentioned here means a relatively long time like 24 hours. The continuous operation mentioned here includes also a condition which can be regarded as substantially operated such as when standby mode is selected.

If it is determined that the radio transmission apparatus was operated continuously for a predetermined time interval, "Always Can be Powered" is displayed on the display portion of the radio transmission apparatus (step S22). If it is determined that the radio transmission apparatus was not operated continuously for a predetermined time interval, "Not Always Can be Powered" is displayed on the display portion of the radio transmission apparatus (step S22). If a power is supplied from an electronic appliance connected to this radio transmission apparatus, it is permissible to determine the continuous operating condition of the electronic appliance by communication with that electronic appliance through a bus line and then carry out processings of steps S22, S23 by making the same determination.

Figure 10:
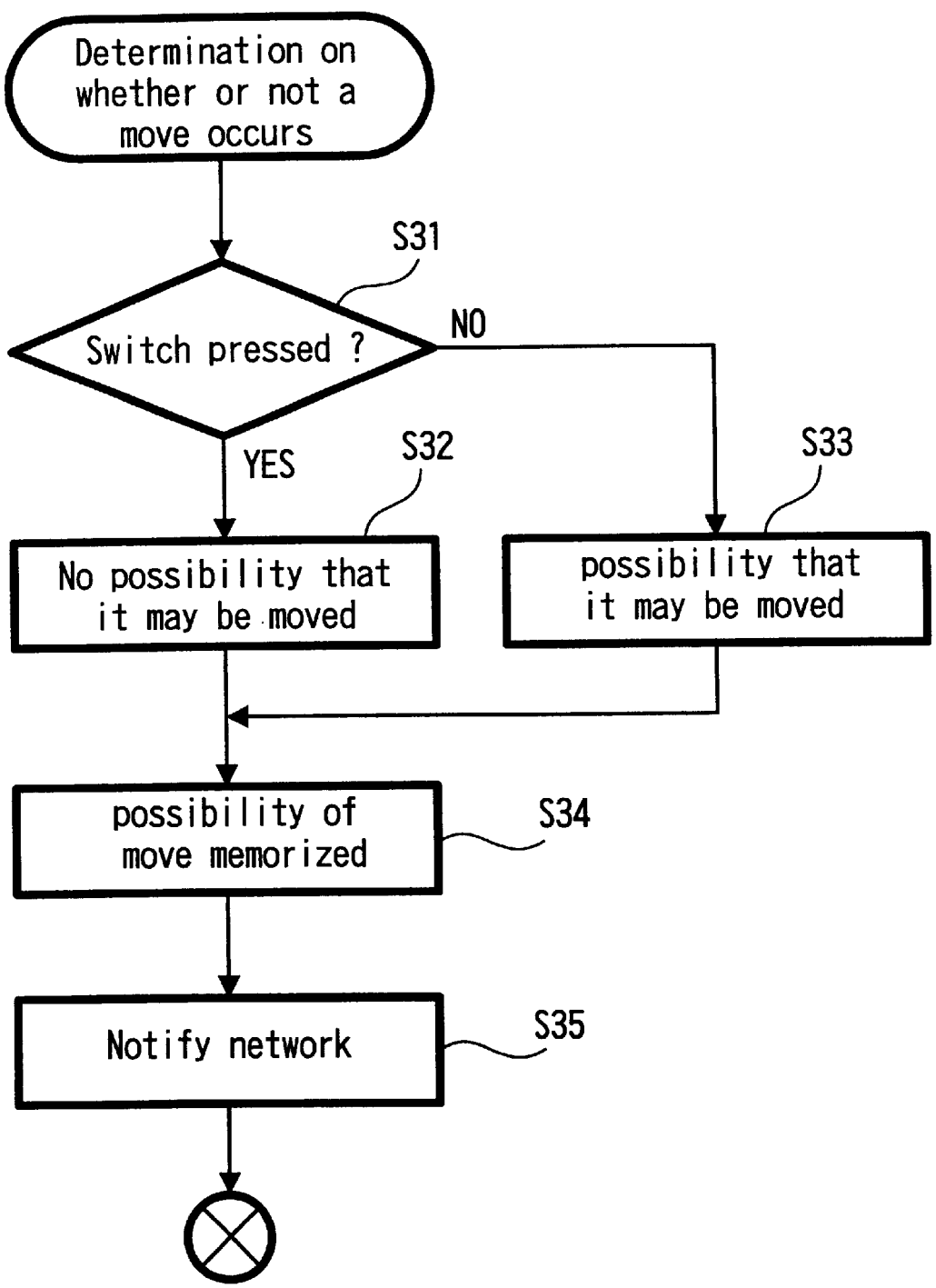
FIG. 10 is a flow chart showing an example of a processing for determining whether or not a move occurs according to an embodiment of the present invention.

Next, a processing for the control portion 25 of the radio transmission apparatus constituting each communication station to determine whether or not the radio transmission apparatus has been moved will be described with reference to a flow chart shown in FIG. 10. First, the control portion 25 determines whether or not the switch 25a connected to he control portion 25 has been kept ON for a predetermined time interval (step S31). The predetermined time interval mentioned here means a relatively long hour such as 24 hours or several days.

Then, when it is determined that the switch 25a has not been changed such that it is kept ON for a predetermined time interval, it is determined that there is no possibility that the apparatus may be moved (that is, it cannot be carried) (step S32). When it is determined that the switch 25a was changed to OFF during a predetermined time interval, it is determined that there is a possibility that the apparatus may be moved (that is, it can be carried) (step S33).

If the control portion 25 makes this determination, information about whether or not there is a possibility that the apparatus has been moved, determined at this time is memorized in the internal memory 26 (step S34) . Then, the information about whether or not there is a possibility that the apparatus has been moved memorized in the internal memory 26 is attached to the move possibility information section (see FIG. 6) of the station synchronous signal sent from this communication station and transmitted by radio in the network (step S35).

Figure 11:
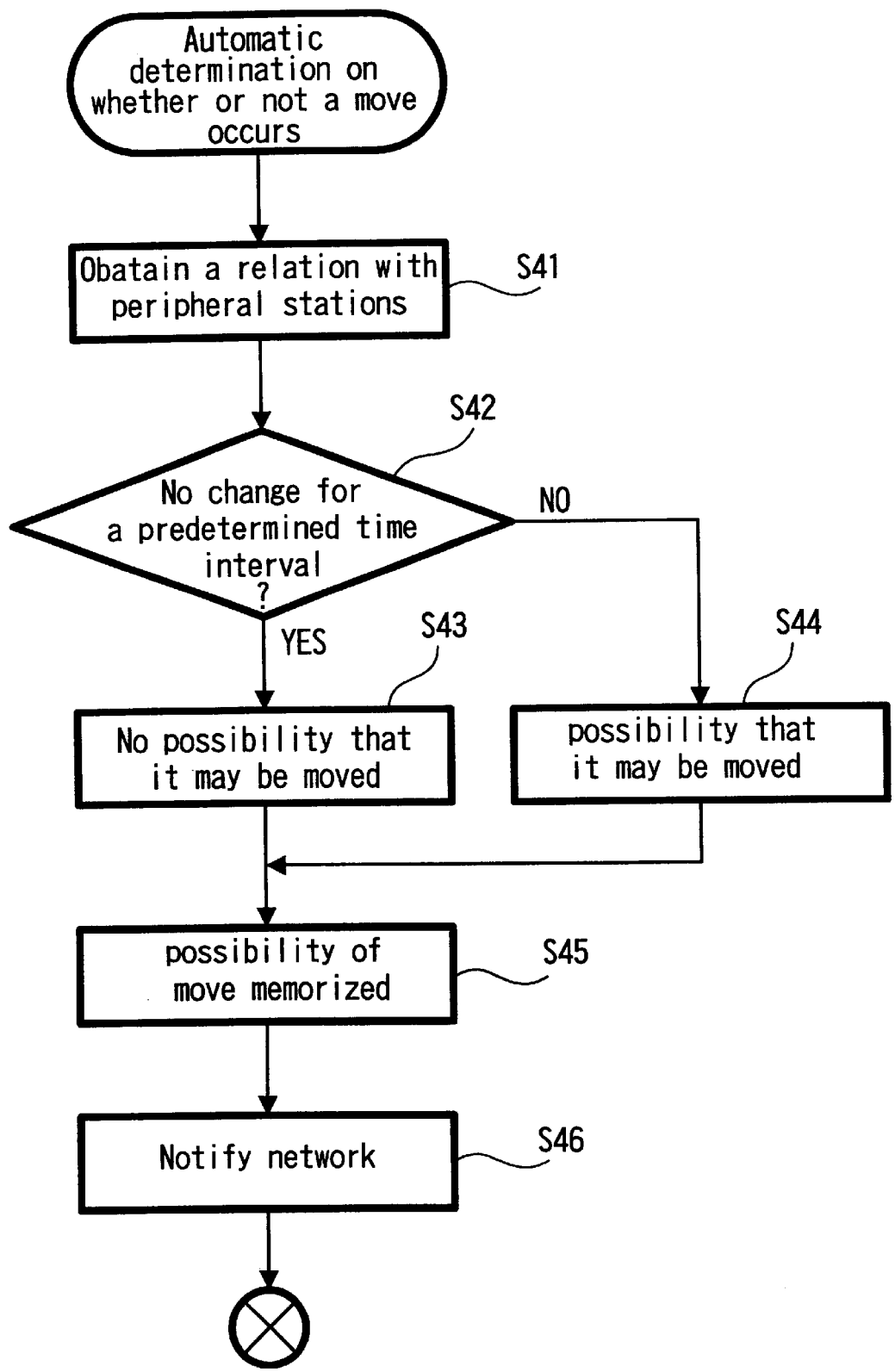
FIG. 11 is a flow chart showing an example of a processing for determining whether or not a move occurs according to another embodiment of the present invention.

Although the move possibility is determined depending on a status of the switch provided on the radio transmission apparatus, it is permissible to automatically determine the move possibility depending on a change in communication with other communication station. That is, as shown in FIG. 11, information about radio communication state of the control portion 25 with its peripheral stations is obtained (step S41). The information about radio communication with the peripheral stations includes data of topology map contained in management information sent from the central control station, reception condition of the synchronous signal sent from other stations and the like. Then, whether or not radio communication with the peripheral stations has been kept changed for a predetermined time interval is determined (step S42). The predetermined time interval mentioned here means a relatively long time such as 24 hours or several days.

When it is determined that communication with the peripheral station has not been changed for a predetermined time interval, it is determined that there is no possibility that the apparatus may be moved (that is, it cannot be carried) (step S43). If it is determined that communication with the peripheral stations has been changed during a predetermined time interval, it is determined that there is a possibility that the apparatus may be moved (that is, it can be carried) (step S44).

Then, if the control portion 25 makes this determination, information about the move possibility determined at that time is memorized in the internal memory 26 (step S45). Then, the information about the move possibility memorized in the internal memory 26 is attached to the move possibility information section (see FIG. 6) of the station synchronous signal sent from this communication station and transmitted by radio in the network (step S46).

Next, setting of the communication control information based on the power supply condition of each station and move possibility information will be described. First, the determination processing of each terminal station in case where the network shown in FIG. 2 is built will be described with reference to a flow chart shown in FIG. 12. Whether or not management information from the central control station can be received by each station is determined (step S51). In the case of the network shown in FIG. 2, the management information from the central control station can be received directly by stations except the communication station 7 of the identification ID#7. Therefore, a terminal station capable of communicating with the central control station directly becomes a peripheral terminal station (step S59).

If it is determined that the management information from the central control station cannot be received in step S51, reception of the station synchronous signal from the peripheral terminal station is tried (step S52). Whether or not there is a candidate station for a parent station is determined by reception of the station synchronous signal (step S53). The candidate station for the parent station means a station capable of relaying management information from the central control station. If there is no candidate station for the parent station, it is regarded that there is no terminal station.

If there is a candidate station for the parent station in step S53, information about power supply condition is obtained by determining information attached to the station synchronous signal to be transmitted from that station (step S54). Then, move possibility information is obtained (step S55). By determining information of the power supply condition and information of the move possibility, whether or not the candidate station can relay is determined (step S56).

If the candidate station can be always powered and there is no possibility that that station may be moved, in step S56, the candidate station is determined to be a station capable of relaying. Otherwise, the candidate station is determined to be a station not suitable for relay. If it is determined that the candidate station is a station not suitable for relay in step S56, the processing is returned to step S53, in which a processing for finding out another candidate station is carried out.

If it is determined that the candidate station is a station capable of relaying in step S56, data requesting to specify the relay station is sent to that station (step S57), so that that a target station becomes a hidden terminal station (step S58). The hidden terminal station becomes capable of communicating with other stations in the network based on a signal relayed by the station requested to be a relay station in step S57. In the case of the network configuration shown in FIGS. 1, 2, the communication station 7 incapable of communicating with the central control station directly becomes the hidden terminal station. In this case, if either the communication station 3 or communication station 6 capable of communicating with this communication station 7 directly is determined to be capable of relaying in step S56 (if always can be powered and there is no possibility that it may be moved), either the communication station 3 or 6 is specified as a relay station and then the communication station 7 becomes the hidden terminal station.

A processing in a station requested to be a relay station will be described with reference to a flow chart shown in FIG. 13. If that station receives data specifying it to be a relay station (step S61), that station obtains information about its own power supply condition (step S62). Then, it obtains information about its own move possibility (step S63). Finally, whether or not that station is capable of relaying is determined based on those information (step S64). If the station can be always powered and there is no possibility that it may be moved, it is determined that that station is capable of relaying and otherwise, it is determined that it is not capable of relaying.

If it is determined that the station is capable of relaying, a response signal ACK is sent back to the hidden terminal station (step S65) so that a parent station's operation to the hidden terminal station is started (step S66). If it is determined that the station is not capable of relaying, a negative response signal NACK is sent back to the hidden terminal station (step S67).

Because the setup for relay to the hidden terminal station is carried out only if both the power supply condition and move possibility are suitable for the relay, the setup of the hidden terminal station in building up the radio network can be carried out after the parent station for the hidden terminal station is chosen appropriately. That is, a terminal station which cannot be operated continuously because it is driven with a secondary battery or a terminal station which may not be capable of relaying because it may be moved is never chosen as a relay parent station. Only a terminal station which can be operated continuously with commercial power supply and may not be moved is chosen as the hidden terminal station, so that the relay operation to the hidden terminal station is carried out continuously with a stabilized condition.

Although in the above description, the relay parent station is determined only if the power supply condition and move possibility are suitable for the relay operation, it is permissible that either the power supply condition or move possibility is considered and if either of them is suitable for the relay operation, the relay parent station is set up.

Figure 12:
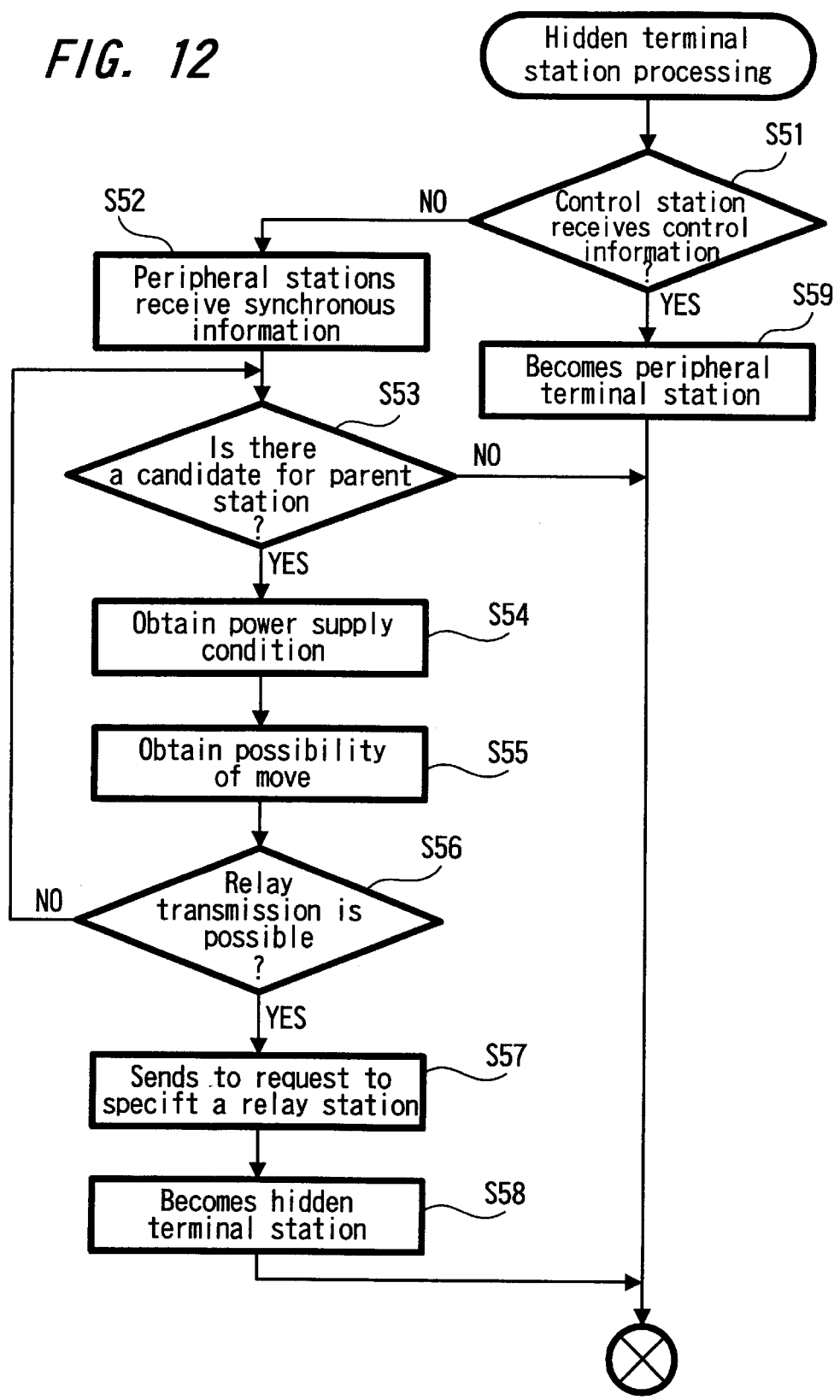
FIG. 12 is a flow chart showing an example of a processing for specifying a relay parent station by a hidden terminal station according to an embodiment of the present invention.
Figure 13:
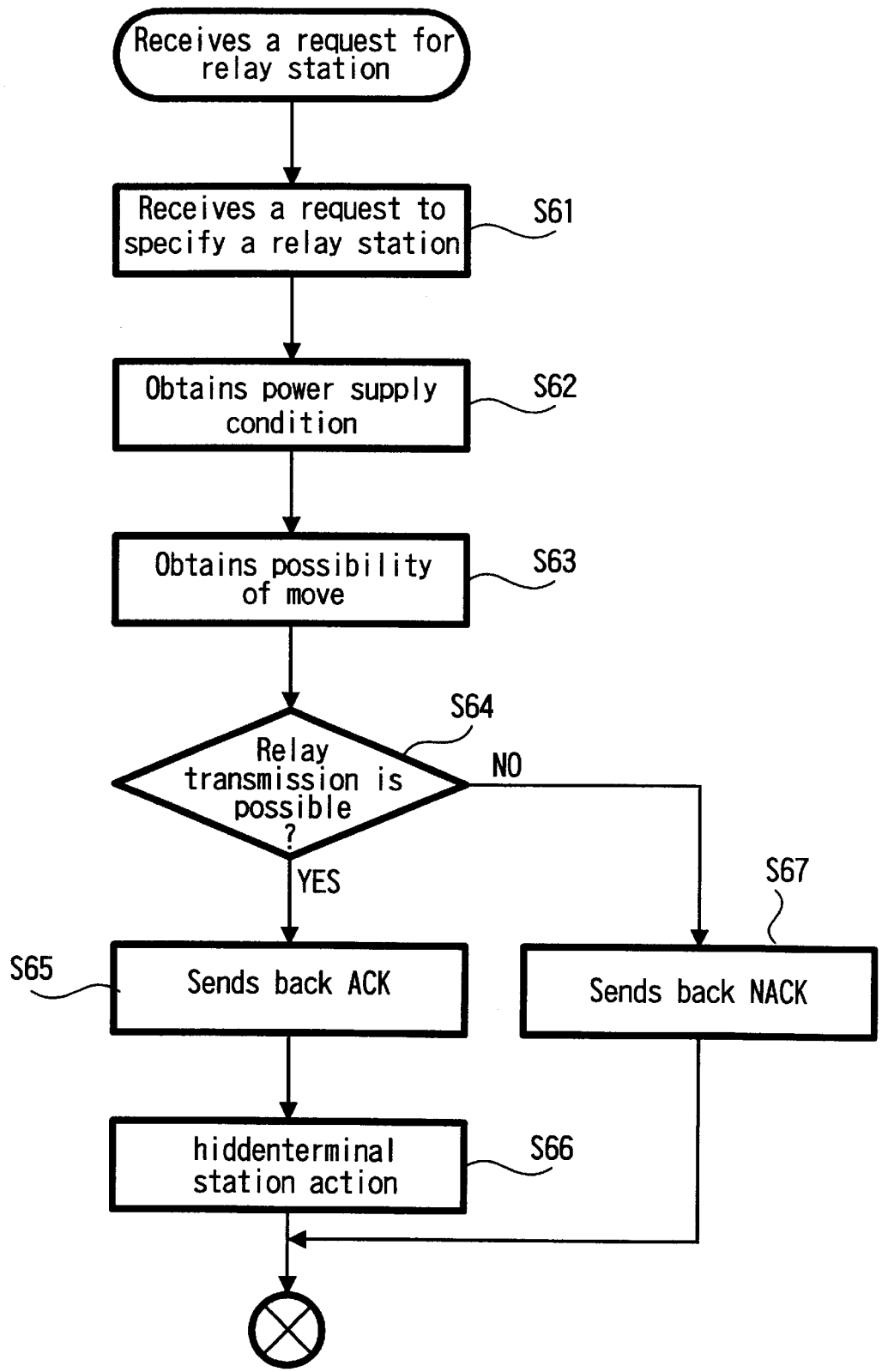
FIG. 13 is a flow chart showing an example of a processing when a request for acting as a relay station is received.

According to the above described embodiment, whether or not a station is suitable for a relay parent station is determined according to information transmitted from other stations by the hidden terminal station in a processing shown in the flow chart of FIG. 12 and at the same time, a station requested to be relay parent station according to an instruction from the hidden terminal station also determines whether or not that station is suitable for the relay parent station in a processing shown in the flow chart of FIG. 13. However, it is permissible to determine on either of them. That is, as shown in the flow chart of FIG. 12, if the hidden terminal station can determine adaptability of the relay parent station, it is permissible to determine only according to determination of the hidden terminal station. Further, it is permissible that only when a candidate station is requested to be a relay parent station by the hidden terminal station, as shown in the flow chart of FIG. 13, that station may carry out a processing for acknowledging that it becomes a relay parent station.

According to the above described embodiment, the adaptability of the relay parent station is determined according to both the power supply condition and move possibility. However, it is permissible to determine the adaptability of the relay parent station according to other factor of the radio transmission apparatus constituting each station.

Although according to the above described embodiment, the adaptability of the relay parent station is determined for setting up a hidden terminal station according to either the power supply condition or move possibility, it is permissible to determine the adaptability for other settings according to the power supply condition and move possibility. For example, when a communication station is set up as a central control station, it is permissible that whether or not that station is suitable for the central control station is determined according to either the power supply condition or move possibility.

Figure 14:
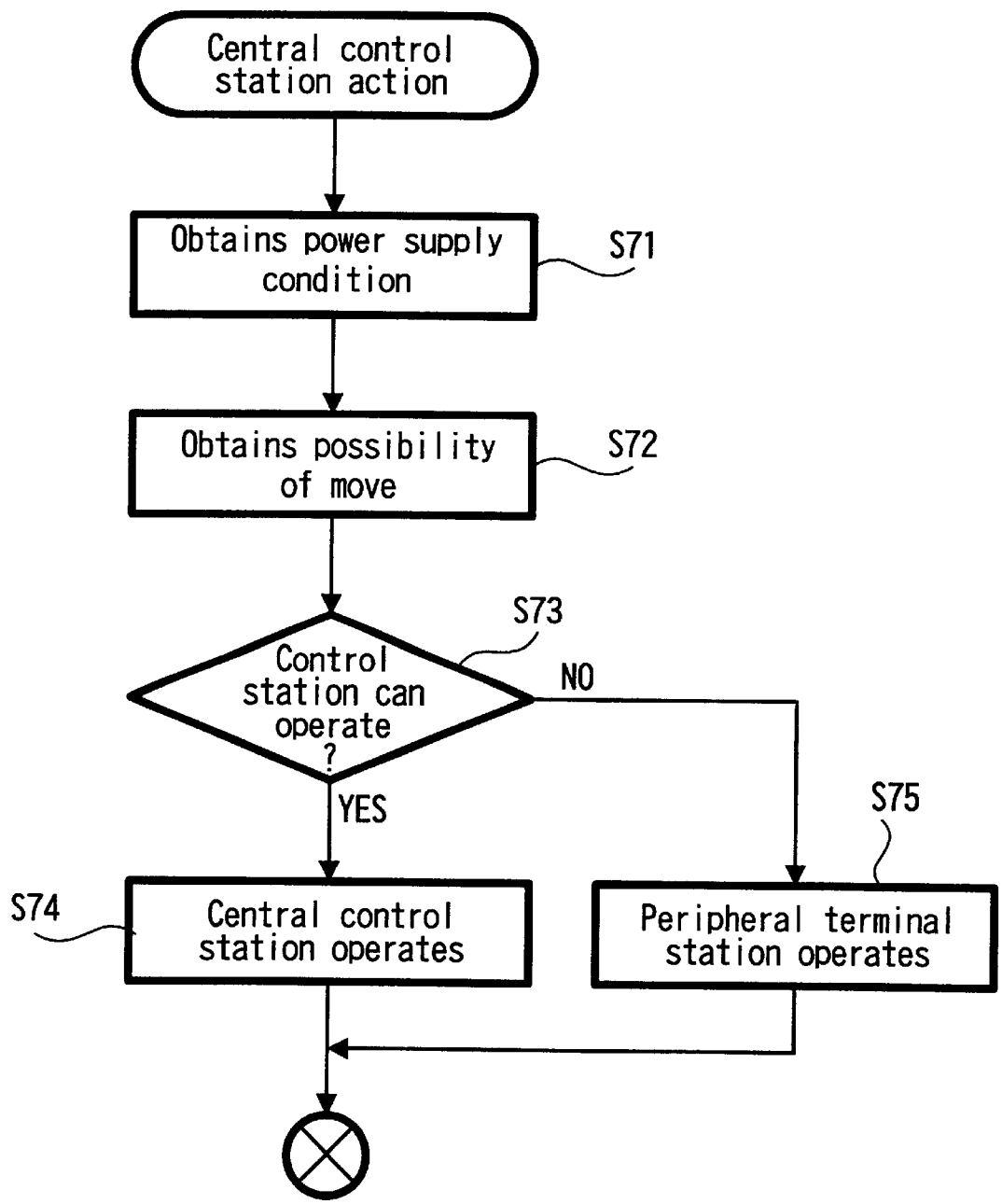
FIG. 14 is a flow chart showing an example of processing for determining adaptability as the central control station according to an embodiment of the present invention.

A flow chart of FIG. 14 shows an example of the processing for determining the adaptability of the central control station. When a station is set up as a central control station, information about power supply condition to that station is obtained (step S71). Then, information about move possibility of that station is obtained (step S72) and whether or not the station is suitable for an operation of the central control station is determined according to those informations (power supply condition and move possibility) (step S73). When it is determined that that station is suitable for the central control station according to both the power supply condition and move possibility (or either), the station is set up to act as the central control station (step S74). If it is determined that the station is not suitable for the central control station according to both the power supply condition and move possibility (or either), the station is set up to act as not the central control station but a terminal station (step S75). If that station is set up to act as the terminal station, an operation for setting up other station as the central control station is necessary.

The frame structure and transmission data described in the above embodiment are only an example, but the present invention is not restricted to the above described structure. Further, the structure of the radio transmission apparatus is not restricted to the above described example. The above described transmission control processing can be applied to a communication network comprised of radio transmission apparatuses suitable for various radio transmission methods.

According to the radio transmission method, only if each communication station is in a condition suitable for relay transmission, the relay transmission is enabled through that station. Thus, a problem which may occur when the relay transmission is tried through a station not suitable for the relay transmission can be avoided.

According to the radio transmission method, a predetermined condition required for a relay station is power supply condition and whether or not relay transmission is possible is determined based on the determined power supply condition. Thus, only if the condition of power supply to each communication station is suitable for the relay transmission, the relay transmission through that station is enabled. For example, the relay transmission through a station whose power supply condition is limited is restricted.

According to the radio transmission method, the predetermined condition required for the relay station is presence/absence of portability and whether or not relay transmission is possible is determined based on the determined presence/absence of portability. In a portable communication station, its transmission function which can be realized therein may be limited depending on a place which it is placed. A transmission disturbance, which may disable relay transmission because the station is carried to other place, can be prevented, so that radio communication within the network is secured.

According to the radio transmission method, determination on the presence/absence of portability of a station is carried out according to determination on whether or not an electronic appliance connected to the station can be carried. Thus, the portability of the station can be determined accurately based on the portability of the connected electronic appliance. For example, even if a given station is constituted of a portable transmission apparatus, if the connected electronic appliance is not portable, it is regarded that the station is not portable and it is possible to set up so that the relay transmission is enabled.

According to the radio transmission method described in claim 5, the determination on the presence/absence of portability is carried out according to a change in radio communication condition with other communication station in the radio network. For example if there is no change in the radio transmission with other particular communication station in a predetermined interval, it is regarded that the position of the station is not changed and that station is not portable. Then, the station can be automatically set up as a non-portable station.

According to the radio transmission method, the determination on the presence/absence of portability is carried out according to a change in radio communication condition with other communication station in the radio network. For example if there is no change in the radio transmission with other particular communication station in a predetermined interval, it is regarded that the position of the station is not changed and that station is not portable. Then, the station can be automatically set up as a non-portable station.

According to the radio transmission method, the predetermined condition is power supply condition and presence/absence of portability and whether or not relay transmission is possible is determined according to both the power supply condition and presence/absence of portability. Thus, only when both the condition of power supply to each station and presence/absence of portability are suitable for the relay transmission, the relay transmission is enabled through that station, so that the relay transmission can be carried out further securely.

According to the radio transmission method, data of determination on whether or not relay transmission is possible is sent to the central control station or other communication station. Thus, when transmission in the network is carried out by the central control station or the like, it is possible to determine a communication station capable of relay transmission.

According to the radio transmission apparatus, only when the radio transmission apparatus is in a condition suitable for relay transmission, the relay transmission through this radio transmission apparatus is enabled. Thus, a problem, which may occur if the relay transmission is tried when the apparatus is in a condition not suitable for the relay transmission, can be avoided.

According to the radio transmission apparatus, the predetermined condition to be determined by the condition determining means is power supply condition and the control means determines whether or not relay transmission is possible based on the power supply condition. Only when the condition of power supply to this radio transmission apparatus is in a condition suitable for the relay transmission, the radio transmission apparatus is set to condition enabling the relay transmission. For example, if the power supply condition is limited because the station is powered by a battery, the relay transmission is restricted.

According to the radio transmission apparatus, the predetermined condition to be determined by the condition determining means is presence/absence of portability and the control means determines whether or not relay transmission is possible based on the determined presence/absence of portability. Thus, a communication disturbance which disables the relay transmission when this radio transmission apparatus is moved can be prevented, so that radio transmission in the radio network including this radio transmission apparatus can be achieved securely.

According to the radio transmission apparatus, the determination on presence/absence of portability is carried out depending on whether or not an electronic appliance connected to the apparatus can be carried. Thus, a possibility that a given radio transmission apparatus may be moved can be determined accurately based on the portability of the connected electronic appliance. For example, even if this radio transmission apparatus is comprised of a portable transmission apparatus, if the connected electronic appliance is not portable, it is regarded that that radio transmission apparatus is not portable. As a result, this radio transmission apparatus can be set up such that it is capable of relay transmission.

According to the radio transmission apparatus, the determination on the presence/absence of portability by the condition determining means is carried out according to a change in radio communication condition with other communication station in the radio network. For example, if there is no change in the radio communication condition between this radio transmission apparatus and other apparatus, it is regarded that the change of this radio transmission apparatus is not changed and it is regarded that that apparatus is not portable. As a result, that apparatus can be automatically set up as a non-portable apparatus.

According to the radio transmission apparatus, the determination on the presence/absence of portability by the condition determining means is carried out depending on a condition of a predetermined switch. Therefore, it is possible to determine the portability more securely based on the switch condition determined by the installation condition of the apparatus or a condition of the switch operated by user.

According to the radio transmission apparatus, the predetermined condition to be determined by the condition determining means is power supply condition and presence/absence of portability and the control means determines whether or not relay transmission is possible according to the power supply condition and presence/absence of portability. Only if both the condition of power supply to the apparatus and presence/absence of portability are suitable for the relay transmission, the relay transmission is carried out by this apparatus. As a result, it is possible to set up so that the relay transmission can be achieved further securely.

According to the radio transmission apparatus, data of determination on whether or not relay transmission is possible made by the control means is attached to data to be transmitted by the communication processing means. Thus, other stations in the radio network which this radio transmission apparatus belongs to can determine a station capable of relay transmission securely.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A radio transmission method for carrying out radio transmission in a radio transmission network comprised of plural communication stations comprising the steps of:
   causing at least one station of said plural communication stations to determine a power supply condition of itself,
   causing said at least one station to determine whether the determined power supply condition represents an appropriate supply voltage and whether said at least one station is capable of relaying a signal sent from an other station according to the determined power supply condition, and
   when it is determined that the relay transmission is possible, causing said at least one station to set up itself in a condition capable of relay transmission, and
   sending data on whether relay transmission is possible to another communication station of the plural communication stations by including as part of a transmission frame a station synchronous transmission/reception section having power supply information and move possibility information.

2. A radio transmission method for carrying out radio transmission in a radio transmission network comprised of plural communication stations comprising the steps of:
   causing at least one station of said plural communication stations to determine a presence/absence of portability of itself and whether the at least one station is a mobile unit,
   causing said least one station to determine based on the determined presence/absence of portability whether it is capable of relaying a signal sent from other station according to the determined presence/absence of portability condition, and
   when it is determined that the relay transmission is possible, causing said at least one station to set up itself in a condition capable of relay transmission, and
   sending data on whether relay transmission is possible to another communication station of the plural communication stations by including as part of a transmission frame a station synchronous transmission/reception section having power supply information and move possibility information.

3. The radio transmission method according to claim 2 wherein determination of the presence/absence of portability of a station is carried out according to the further step of determining whether an electronic appliance connected to the station can be carried by a user.

4. The radio transmission method according to claim 2 wherein determination of the presence/absence of portability is carried out according to the further step of detecting a change in radio communication condition with another communication station in the radio transmission network.

5. The radio transmission method according to claim 2 comprising the further step of sending data on whether relay transmission is possible to one of the central control station and another communication station.

6. A radio transmission apparatus for carrying out radio communication with another communication station in a radio network, the apparatus comprising:
   communication processing means for transmitting or receiving a radio signal;
   condition determining means for determining a power supply condition of the apparatus; and
   control means for determining whether the determined power supply condition represents an appropriate supply voltage and whether relay transmission is possible according to a determination of whether the power supply condition determined by said condition determining means represents an appropriate supply voltage and for carrying out the relay transmission with said communication processing means according to said determination, and
   wherein data of determination on whether the relay transmission is possible made by the control means is attached to data to be transmitted by the communication processing means, and
   wherein the data includes as part of a transmission frame a station synchronous transmission/reception section having power supply information and move possibility information.

7. A radio transmission apparatus for carrying out radio communication with another communication station in a radio network, the apparatus comprising:
   communication processing means for transmitting or receiving a radio signal;
   condition determining means for determining a presence/absence of portability of the apparatus and whether the apparatus is a mobile unit; and
   control means for determining based on the determined presence/absence of portability whether relay transmission is possible according to a determination by said condition determining means and for carrying out the relay transmission with said communication processing means according to said determination, and
   wherein data of determination on whether the relay transmission is possible made by the control means is attached to data to be transmitted by the communication processing means, and
   wherein the data includes as part of a transmission frame a station synchronous transmission/reception section having power supply information and move possibility information.

8. The radio transmission apparatus according to claim 7 wherein the determination on the presence/absence of portability is carried out depending on whether an electronic appliance connected to said apparatus can be carried by a user.

9. The radio transmission apparatus according to claim 7 wherein the determination on the presence/absence of portability by the condition determining means is carried out by detecting a change in a radio communication condition with another communication station in the radio network.

10. The radio transmission apparatus according to claim 7 further comprising a switch, wherein the determination on the presence/absence of portability by the condition determining means is carried out depending on a condition of the switch.

11. The radio transmission apparatus according to claim 7, wherein data of determination on whether the relay transmission is possible made by the control means is attached to data to be transmitted by the communication processing means.

* * * * *